United States Patent
Ngo et al.

[11] Patent Number: 6,046,776
[45] Date of Patent: *Apr. 4, 2000

[54] BURST GATE PULSE GENERATOR

[75] Inventors: Duc Ngo, San Jose; Chun Yee, Sunnyvale, both of Calif.

[73] Assignees: Sony Corporation, Tokyo, Japan; Sony Electronics, Inc., Park Ridge, N.J.

[*] Notice: This patent is subject to a terminal disclaimer.

[21] Appl. No.: 09/110,091

[22] Filed: Jul. 2, 1998

Related U.S. Application Data

[63] Continuation of application No. 08/583,986, Jan. 11, 1996
[60] Provisional application No. 60/000,407, Jun. 21, 1995.

[51] Int. Cl.[7] .............................. H04N 9/44; H04N 9/445
[52] U.S. Cl. ..................... 348/506; 348/505; 348/512; 348/539; 348/540; 386/13; 386/46
[58] Field of Search ..................... 348/505, 506, 348/512, 513, 514, 539, 540, 549, 638, 639, 500; 358/13, 17, 19, 20, 326, 335, 320; 386/46, 13; H04N 9/44

[56] References Cited

U.S. PATENT DOCUMENTS

| | | | |
|---|---|---|---|
| 5,812,208 | 9/1998 | Nayebi | 348/506 |
| 5,815,212 | 9/1998 | Edwards | 348/536 |
| 5,844,621 | 12/1998 | Ngo | 348/505 |

*Primary Examiner*—John K. Peng
*Assistant Examiner*—Wesner Sajous
*Attorney, Agent, or Firm*—Haverstock & Owens LLP

[57] ABSTRACT

A burst gate pulse generator generates a burst gate signal representative of a time period during which a burst signal is present within an input composite video signal. Each period of the input composite video signal includes a horizontal synchronization pulse, a burst signal and a video information signal. The burst gate pulse generator detects the end of the horizontal synchronization signal and begins the burst pulse at the end of the horizontal synchronization signal. A timing circuit including a charge storage device and a charge delivery device controls the duration of the burst pulse. When the burst pulse is activated the charge delivery device begins building a charge across the charge storage device until a threshold value is reached. Once the charge stored across the charge storage device equals the threshold value the burst pulse is deactivated. During the time when the burst pulse is active, the burst signal will be present on the input composite video signal. In order to have a fixed value for a sync tip of the horizontal synchronization pulse and to be able to apply certain thresholds within the burst gate pulse generator, the sync tip of the input composite video signal is clamped to a level equal to 2.5 volts. Preferably, the burst pulse has a duration equal to 3.5 nanoseconds.

21 Claims, 8 Drawing Sheets

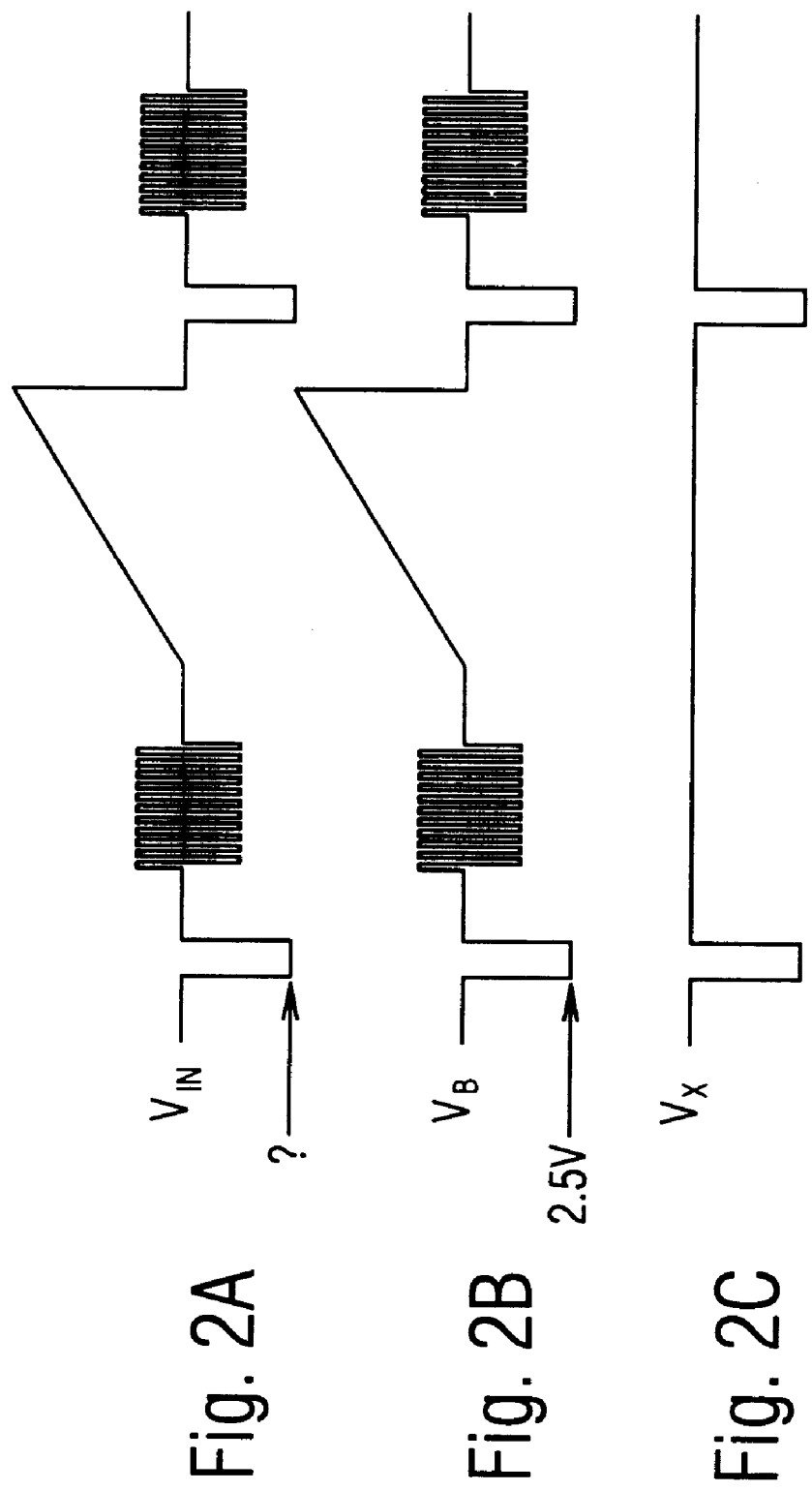

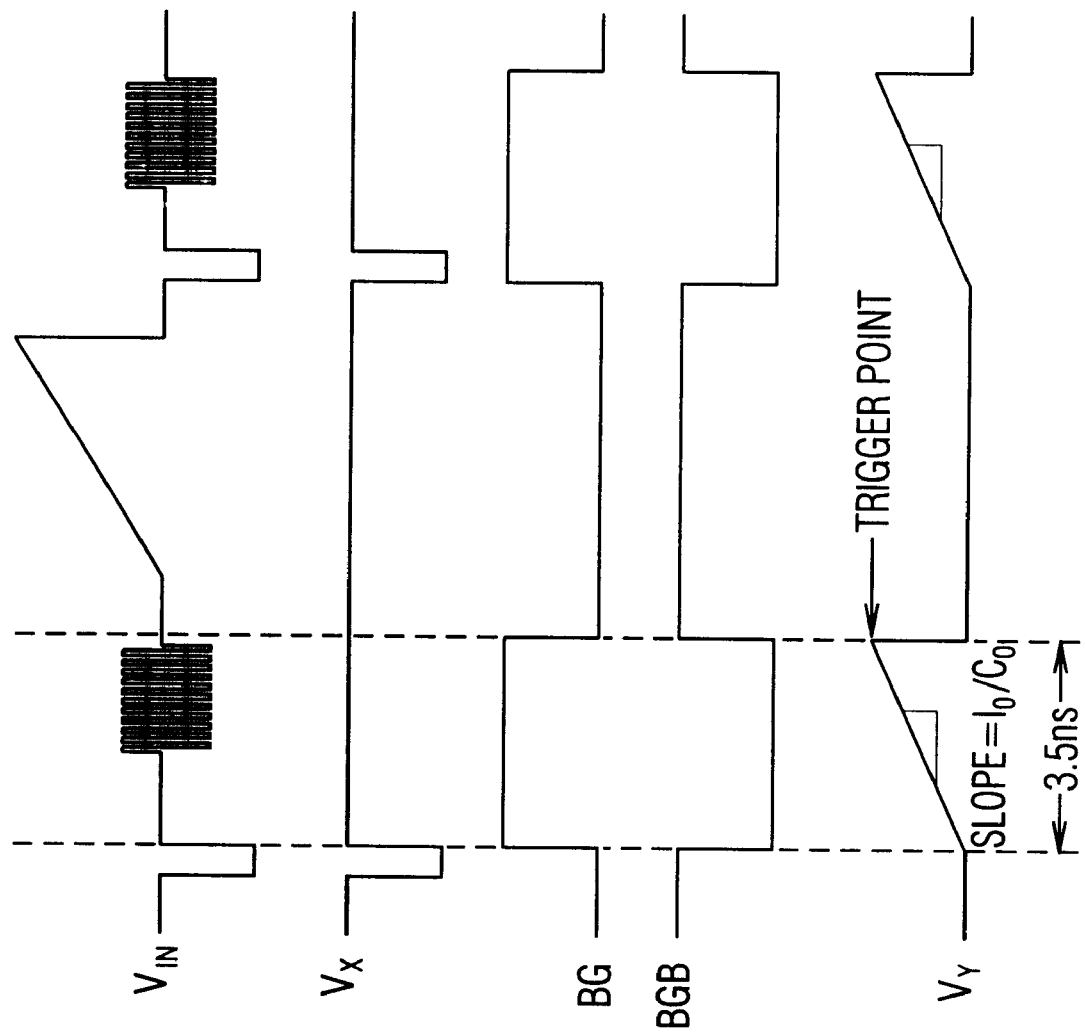

BURST GATE PULSE GENERATOR

This application is a continuation of U.S. patent application Ser. No. 08/583,986 filed on Jan. 11, 1996.

RELATED APPLICATIONS

This application claims priority under 35 U.S.C. § 119(e) of the co-pending U.S. provisional application Ser. No. 60/000,407 filed on Jun. 21, 1995 and entitled "Burst Gate Pulse Generator." The provisional application Ser. No. 60/000,407 filed on Jun. 21, 1995 and entitled "Burst Gate Pulse Generator" is also hereby incorporated by reference.

FIELD OF THE INVENTION

The present invention relates to the field of separating a burst signal from a composite video signal. In particular, the present invention relates to the field of generating a pulse representing the presence of a burst signal for separating the burst signal from a composite video signal.

BACKGROUND OF THE INVENTION:

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

Separator circuits are utilized to separate the horizontal synchronizing signal and the burst signal from the incoming composite video signal. The burst signal consists of a sinusoid with a frequency equal to 3.58 MHz, which is the frequency of the chrominance subcarrier $f_{SC}$. When separating the burst signal from the composite video signal it is necessary for the separator circuitry to determine when the burst signal is present on the incoming composite video signal.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses is accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

It is therefore important to the operation of the video transmission system that the burst signal is separated correctly from the composite video signal. Any error in separating the burst signal may result in an error determining the phase difference between the two signals and will cause the output video signal to be in error. What is needed is a burst gate pulse generator which generates a pulse notifying the burst separator circuitry that the burst signal is present.

SUMMARY OF THE INVENTION

A burst gate pulse generator generates a burst gate signal representative of a time period during which a burst signal is present within an input composite video signal. Each period of the input composite video signal includes a horizontal synchronization pulse, a burst signal and a video information signal. The burst gate pulse generator detects the end of the horizontal synchronization signal and begins the burst pulse at the end of the horizontal synchronization signal. A timing circuit including a charge storage device and a charge delivery device controls the duration of the burst pulse. When the burst pulse is activated the charge delivery device begins building a charge across the charge storage device until a threshold value is reached. Once the charge stored across the charge storage device equals the threshold value the burst pulse is deactivated. During the time when the burst pulse is active, the burst signal will be present on the input composite video signal. In order to have a fixed value for a sync tip of the horizontal synchronization pulse and to be able to apply certain thresholds within the burst gate pulse generator, the sync tip of the input composite video signal is clamped to a level equal to 2.5 volts. Preferably, the burst pulse has a duration equal to 3.5 nanoseconds.

BRIEF DESCRIPTION OF THE DRAWINGS

FIG. 2a illustrates a waveform of an input composite video signal Vin.

FIG. 2b illustrates a waveform representing the signal at the voltage node VB within the circuit, as illustrated in FIG. 1.

FIG. 2c illustrates a waveform representing the signal at the voltage node VX within the circuit, as illustrated in FIG. 1.

FIG. 4a illustrates a waveform of an input composite video signal Vin.

FIG. 4b illustrates a waveform representing the signal at the voltage node VX.

FIG. 4c illustrates a burst gate pulse waveform representing the pulse generated by the pulse generator and timing circuit of FIG. 3.

FIG. 4d illustrates an inverse burst gate pulse waveform representing the inverse of the burst gate pulse waveform.

FIG. 4e illustrates a waveform representing the signal at the voltage node VY within the circuit, as illustrated in FIG. 3.

DETAILED DESCRIPTION OF THE PREFERRED EMBODIMENT

A burst gate pulse generator according to the present invention generates a pulse which is active during the time period when the burst signal is present within the composite video signal. Within a composite video signal, a burst signal traditionally follows a horizontal synchronization signal and precedes the video information signal. The burst gate pulse generator detects the end of the horizontal synchronization signal and begins the burst pulse at the end of the horizontal synchronization signal. Once the burst pulse is active, a timing circuit is used for the determination of the length of the burst pulse. In a conventional video system, a burst signal will be complete within 3.5 nanoseconds (ns) after the trailing edge of the horizontal synchronization signal. Therefore, the burst gate pulse generator of the preferred embodiment ends the burst pulse 3.5 ns after the trailing edge of the horizontal synchronization signal. The timing circuit will deactivate the burst pulse 3.5 ns after the trailing edge of the horizontal synchronization signal. During the time the burst pulse is active, the burst signal will be present on the composite video signal. The burst pulse generated by the burst gate pulse generator of the present invention is used by a burst separator circuit to separate the burst signal from the composite video signal.

Figure 1:
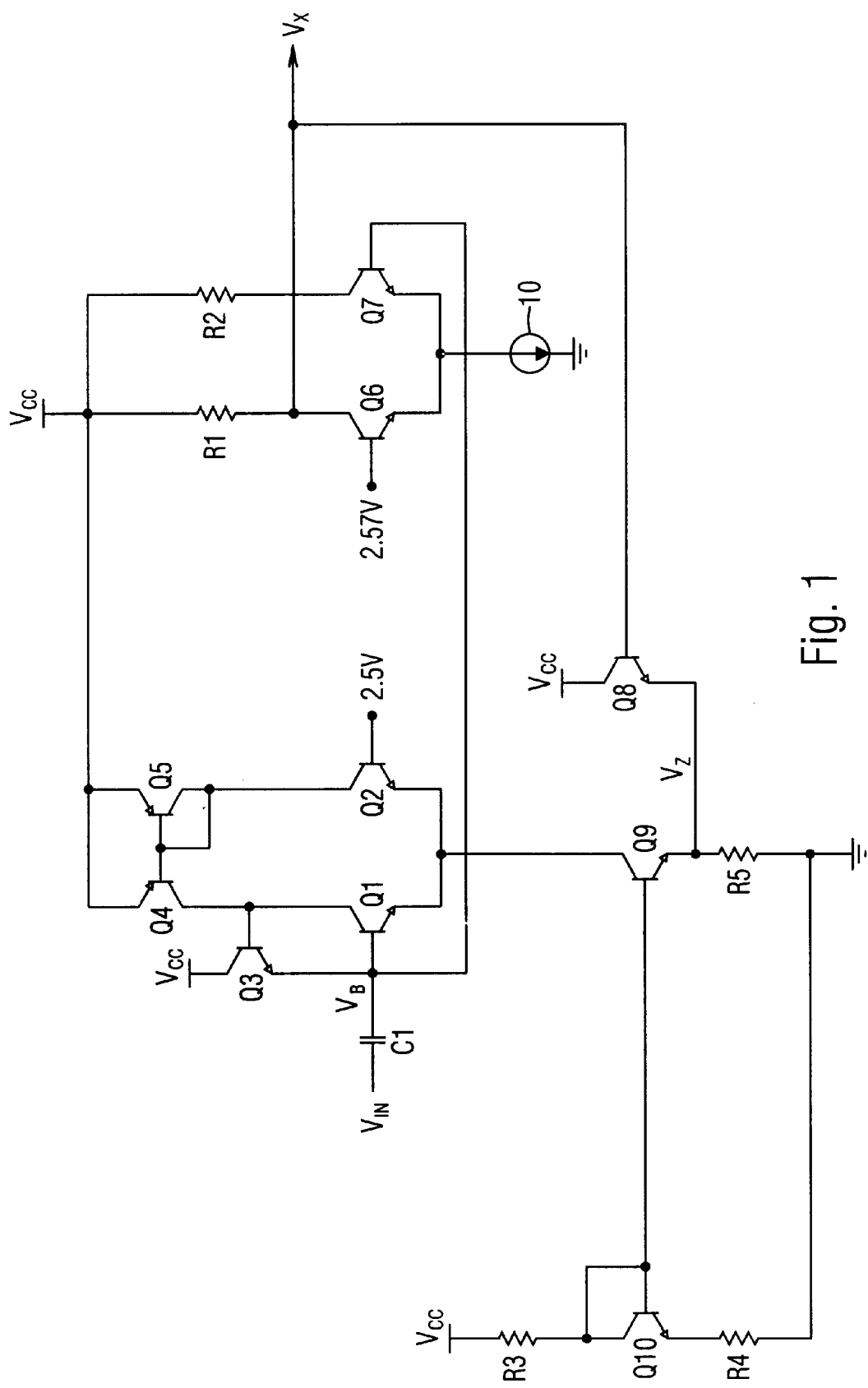
FIG. 1 illustrates a circuit diagram of the clamp and sync separator circuit of the burst gate pulse generator circuit of the present invention.

A circuit diagram of the clamping and sync separator circuit of the burst gate pulse generator of the preferred embodiment is illustrated in FIG. 1. The input composite video signal Vin is coupled to a first terminal of a capacitor C1. The second terminal of the capacitor C1 is coupled to the emitter of an npn transistor Q3, to the base of an npn transistor Q1 and to the base of an npn transistor Q7, thereby forming a voltage node VB. The collector of the transistor Q3 is coupled to a supply voltage VCC. The base of the transistor Q3 is coupled to the collector of the transistor Q1 and to the collector of a pnp transistor Q4. The base of the transistor Q4 is coupled to the base and collector of a pnp transistor Q5 and to the collector of an npn transistor Q2. The emitter of the transistor Q4 and the emitter of the transistor Q5 are coupled together, to the first terminal of a resistor R1, to the first terminal of a resistor R2 and to the supply voltage VCC. The second terminal of the resistor R2 is coupled to the collector of the transistor Q7. The second terminal of the resistor R1 is coupled to the collector of an npn transistor Q6 and to the base of an npn transistor Q8, thereby forming a voltage node VX. A constant voltage threshold level of 2.57 volts is coupled to the base of the transistor Q6. The emitter of the transistor Q6 is coupled to the emitter of the transistor Q7 and to the first terminal of a current source 10. The second terminal of the current source 10 is coupled to ground.

A constant voltage threshold level of 2.5 volts is coupled to the base of the transistor Q2. The emitter of the transistor Q2 is coupled to the emitter of the transistor Q1 and to the collector of an npn transistor Q9. The collector of the transistor Q8 is coupled to the supply voltage VCC. The emitter of the transistor Q8 is coupled to the emitter of the transistor Q9 and to the first terminal of a resistor R5, thereby forming a voltage node VZ. The base of the transistor Q9 is coupled to the base and collector of an npn transistor Q10 and to the first terminal of a resistor R3. The second terminal of the resistor R3 is coupled to the supply voltage VCC. The emitter of the transistor Q10 is coupled to the first terminal of a resistor R4. The second terminal of the resistor R4 is coupled to the second terminal of the resistor R5 and to ground.

In operation, the circuit illustrated in FIG. 1 clamps the sync tip of the horizontal synchronization pulse of the input composite video signal to a level equal to 2.5 volts. The circuit illustrated in FIG. 1 also separates the horizontal synchronization pulse from the input composite video signal and generates an output signal VX comprised of only the horizontal synchronization pulse. Timing diagrams taken at relevant points within the clamp and sync separator circuit of FIG. 1 are illustrated in FIG. 2. An input composite video signal Vin is illustrated in FIG. 2a. A waveform representing the signal at the voltage node VB is illustrated in FIG. 2b. A waveform representing the signal at the voltage node VX is illustrated in FIG. 2c.

The input composite video signal Vin is passed through the input capacitor C1 and is applied to the base of the transistor Q1. The sync tip, or minimum level, of the horizontal sync pulse of the input composite video signal Vin may be at any voltage level as illustrated in FIG. 2a. In order to know the level of the sync tip and to be able to apply certain threshold levels within the circuit, the clamp and sync separator circuit of the present invention clamps the sync tip to a level equal to 2.5 volts. When the voltage at the voltage node VB drops below 2.57 volts, the current flowing through the collector of the transistor Q6 increases, thereby increasing the level of the voltage dropped across the resistor R1. Because more voltage is dropped across the resistor R1, the voltage at the voltage node VX will drop below the biasing voltage for the transistor Q8 and will therefore turn off the transistor Q8.

When the transistor Q8 is turned off and the voltage level at the voltage VB is less than 2.5 volts, the collector currents of the transistors Q1 and Q2 will be mismatched. There will then be more current flowing through the collector of the transistor Q2 than through the collector of the transistor Q1 because the base voltage applied to the transistor Q2 is greater than the base voltage applied to the transistor Q1. The transistors Q4 and Q5 are coupled together in a current mirror configuration causing the current flowing through the collector of the transistor Q4 to equal the current flowing through the collector of the transistor Q5. The current flowing through the collector of the transistor Q5 is equal to the current flowing through the collector of the transistor Q2. Therefore, because more current will be flowing through the collector of the transistor Q4 than the collector of the transistor Q1, the surplus current from the collector of the transistor Q4 will be applied to the base of the transistor Q3. This increase in base current turns on the transistor Q3 harder and dumps enough charge to the voltage node VB to pull the signal at the voltage node VB up to a level equal to 2.5 volts causing equal current to flow through the collectors of the transistors Q1 and Q2. In this manner, the sync tip of the horizontal sync pulse of the composite video signal at the node VB is clamped to a voltage level equal to 2.5 volts.

The composite video signal taken at the node VB will be greater than 2.57 volts at all points on the composite video signal other than the horizontal sync portion. When the voltage at the node VB is greater than 2.57 volts, the voltage at the base of the transistor Q7 will be greater than the voltage at the base of the transistor Q6 resulting in less current flowing through the collector of the transistor Q6. This causes the voltage level at the node VX to rise and turn the transistor Q8 on. When the transistor Q8 is turned on the voltage at the node VZ will rise and will turn off the transistor Q9 thereby disabling the tail current of the differential pair made up of the transistors Q1 and Q2. When the tail current of the differential pair is disabled, the transistors Q1–Q5 are all disabled and the voltage at the node VB will follow the input composite video signal Vin through the input capacitor C1. The differential pair including the transistors Q1 and Q2 will be reenabled when the voltage level of the input composite video signal Vin drops below a level of 2.57 volts. During the horizontal sync period, if the sync tip is below a level of 2.5 volts, the clamp and sync separator circuit, illustrated in FIG. 1, will clamp the sync tip of the input composite video signal to a level equal to 2.5 volts.

As illustrated in FIG. 2c, the voltage VX is a representation of only the horizontal sync pulse portion of the input composite video signal Vin. The signal at the voltage node VX is a constant level during the non-sync period of the input composite video signal Vin. The circuit illustrated in FIG. 1 shifts the input composite video signal at the node VB up until its sync tip is clamped to 2.5 volts. The comparator comprised of the transistors Q6 and Q7 detects the horizontal sync pulse and separates it from the input composite video signal, generating the signal at the node VX.

Figure 3:
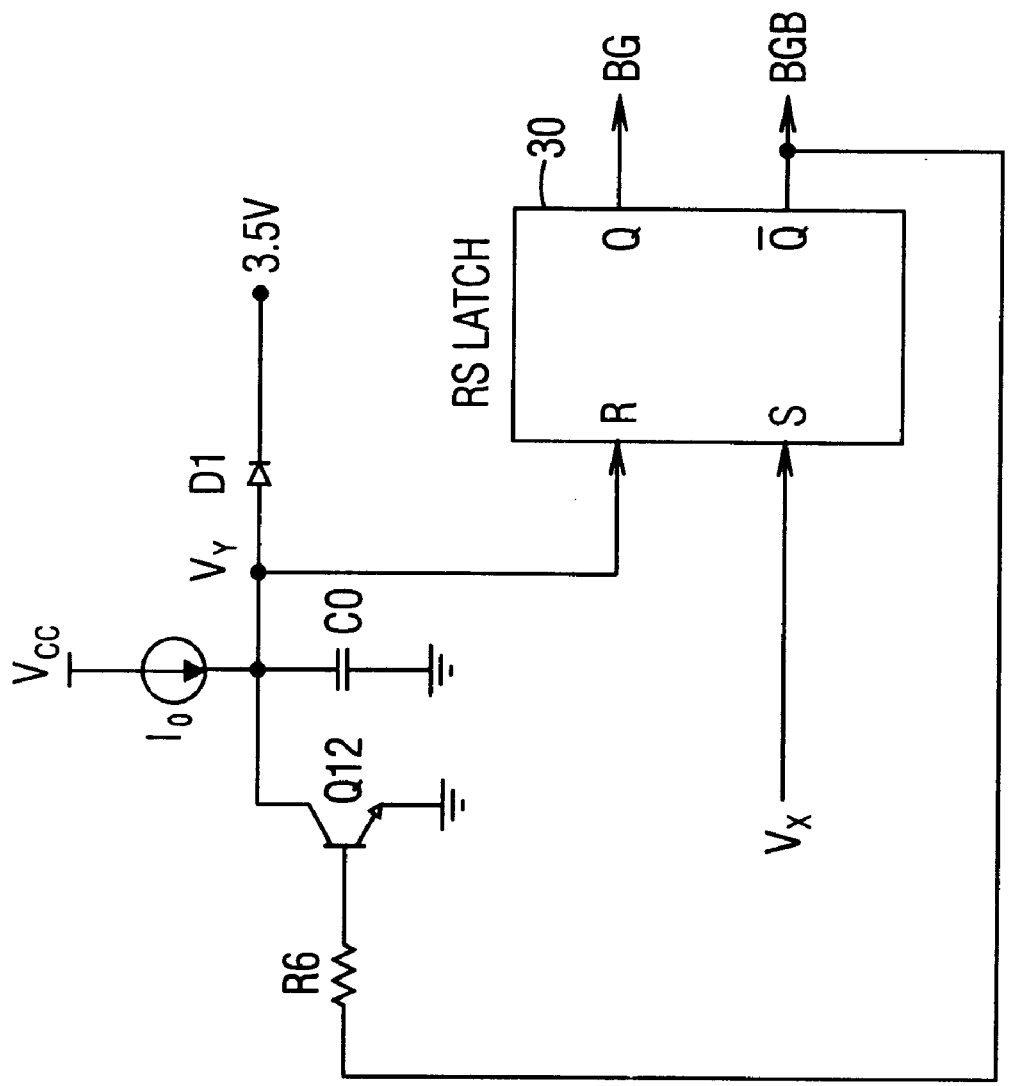
FIG. 3 illustrates a circuit diagram of the pulse generation and timing circuit of the burst gate pulse generator circuit of the present invention.

The second circuit within the burst gate pulse generator circuit of the present invention is illustrated in FIG. 3. The pulse generation and timing circuit illustrated in FIG. 3 detects the end of the horizontal synchronization pulse and generates a burst gate pulse having a duration of 3.5 ns beginning at the trailing edge of the horizontal sync pulse. The burst signal is present on the input composite video signal Vin during the time period when the burst gate pulse is active. The signal from the voltage node VX, of the clamp and sync separator circuit illustrated in FIG. 1, is coupled to the S input of an RS latch 30. The Q output of the RS latch 30 generates a burst gate pulse signal BG. The $\overline{Q}$ output of the RS latch 30 generates an inverse burst gate pulse signal BGB. The $\overline{Q}$ output of the RS latch 30 is coupled to the first terminal of a resistor R6. The second terminal of the resistor R6 is coupled to the base of an npn transistor Q12. The emitter of the transistor Q12 is coupled to ground. The collector of the transistor Q12 is coupled to the first terminal of a current source IO, to the first terminal of a capacitor CO, to the anode of a diode D1 and to the R input of the RS latch 30, thereby forming a voltage node VY. The second terminal of the current source IO is coupled to the supply voltage VCC. The second terminal of the capacitor CO is coupled to ground. A constant voltage threshold level of 3.5 volts is coupled to the cathode of the diode D1.

In operation, the pulse generation and timing circuit illustrated in FIG. 3 detects the trailing edge of a horizontal sync pulse on the signal from the voltage node VX and generates a burst gate pulse, having a duration of 3.5 ns, representing the time period when the burst signal is present within the input composite video signal Vin. Timing diagrams showing the relevant points within the pulse generation and timing circuit of FIG. 3 are illustrated in FIG. 4. The input composite video signal Vin is illustrated in FIG. 4a. The waveform representing the signal at the voltage node VX is illustrated in FIG. 4b. A burst gate pulse BG waveform representing the pulse generated by the pulse generation and timing circuit of FIG. 3 when the burst signal is present within the input composite video signal Vin is illustrated in FIG. 4c. An inverse burst gate pulse BGB waveform representing the inverse of the burst gate pulse BG waveform is illustrated in FIG. 4d. A waveform representing the signal at the voltage node VY is illustrated in FIG. 4e.

The signal from the voltage node VX represents only the horizontal sync pulse of the input composite video signal Vin. It is known that the burst signal is complete within 3.5 ns after the rising edge of the horizontal sync pulse. Therefore, the burst gate pulse generator of the present invention activates the burst gate pulse at the rising edge of the horizontal sync signal from the voltage node VX. The burst gate pulse will be deactivated 3.5 ns after the rising edge of the signal from the voltage node VX. In the preferred embodiment of the present invention this is completed using the precise current source IO to charge the capacitor CO to a threshold voltage level.

On the rising edge of the horizontal sync signal from the voltage node VX, the RS latch 30 causes the Q output and the burst gate pulse signal BG to rise to a logical high voltage level and the $\overline{Q}$ output and the inverse burst gate pulse signal BGB to fall to a logical low voltage level. When the transistor Q12 is on the capacitor CO has a discharge path to ground through the transistor Q12. When the inverse burst gate pulse signal BGB falls to a logical low voltage level on the rising edge of the horizontal synchronization signal, the transistor Q12 is turned off and the discharge path of the capacitor CO is disabled. While the transistor Q12 is turned off, the capacitor CO is charged up by the current source IO. The voltage level at the voltage node VY represents the voltage level stored across the capacitor CO. As illustrated in FIG. 4e, during the charging period of the capacitor CO, the voltage VY across the capacitor CO has a slope equal to the current from the current source IO divided by the value of the capacitor CO. In the preferred embodiment the current source IO and the capacitor CO have been chosen so that the trigger point is reached in 3.5 ns. It will be apparent to those skilled in the art that other values may be chosen for the current source IO and the capacitor CO in order to vary the duration of the burst gate pulse.

When the voltage level across the capacitor CO reaches the trigger point of the RS latch 30, where the R input transitions from a logical low voltage level to a logical high voltage level, the outputs Q and $\overline{Q}$ of the RS latch 30 will flip their states deactivating the burst gate pulse. At this point the Q output and the burst gate pulse signal BG will fall to a logical low voltage level and the $\overline{Q}$ output and the inverse burst gate pulse signal BGB will rise to a logical high voltage level. The outputs Q and $\overline{Q}$ of the RS latch 30 will transition again, activating the burst gate pulse, at the next rising edge of the horizontal sync signal from the voltage node VX.

The burst gate pulse signal BG taken from the output of the RS latch 30 will be used by the video system to detect the presence of the burst signal in order to separate the burst signal from the input composite video signal Vin. The burst signal separation circuit is notified that the burst signal is present when the burst gate pulse signal BG is active.

Figures 1, 5A:
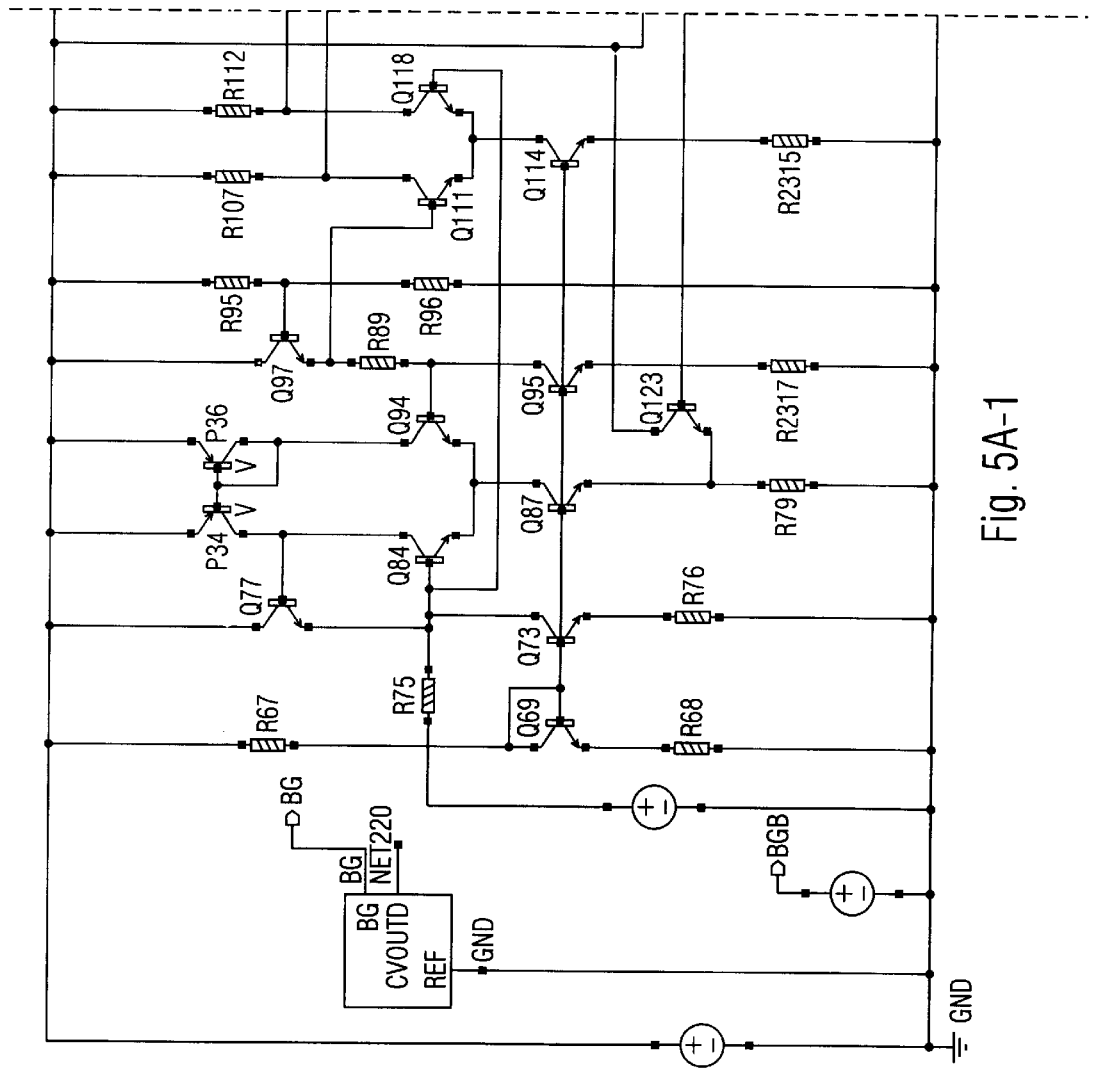
FIGS. 5a and 5b together illustrate a detailed schematic of a preferred embodiment of the burst gate pulse generator.
Figures 2, 5A:
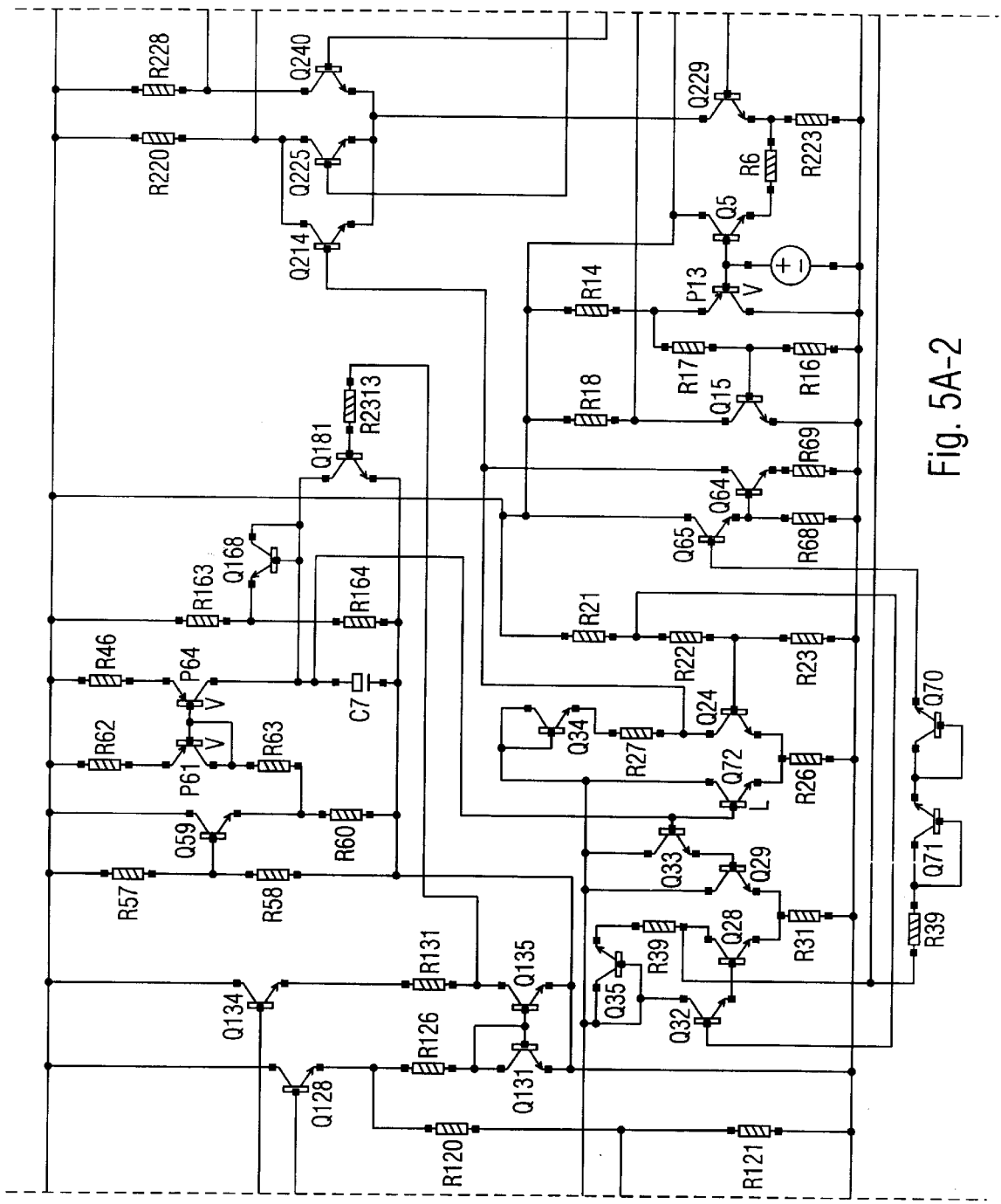
Figures 1, 5B:
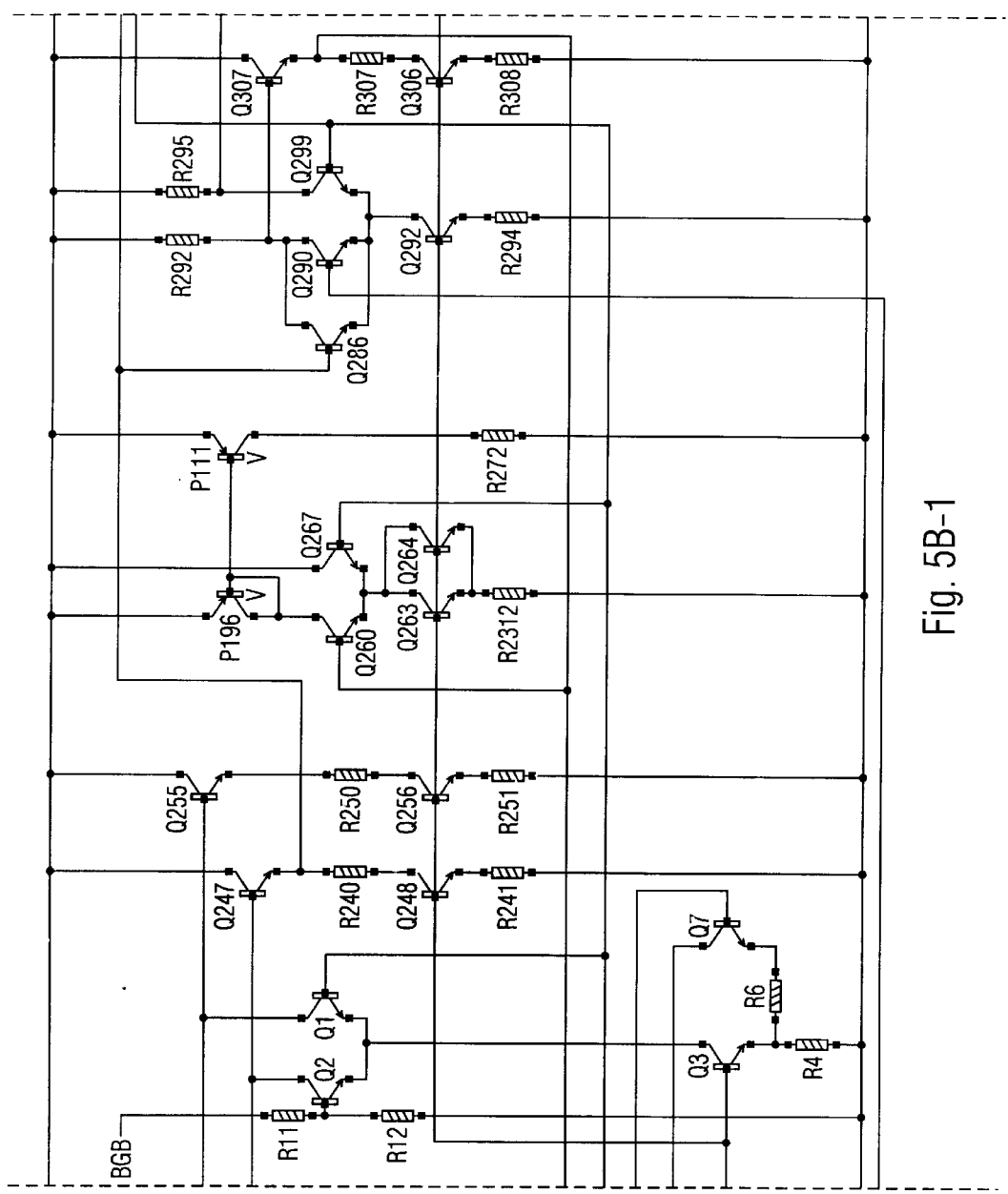
Figures 2, 5B:
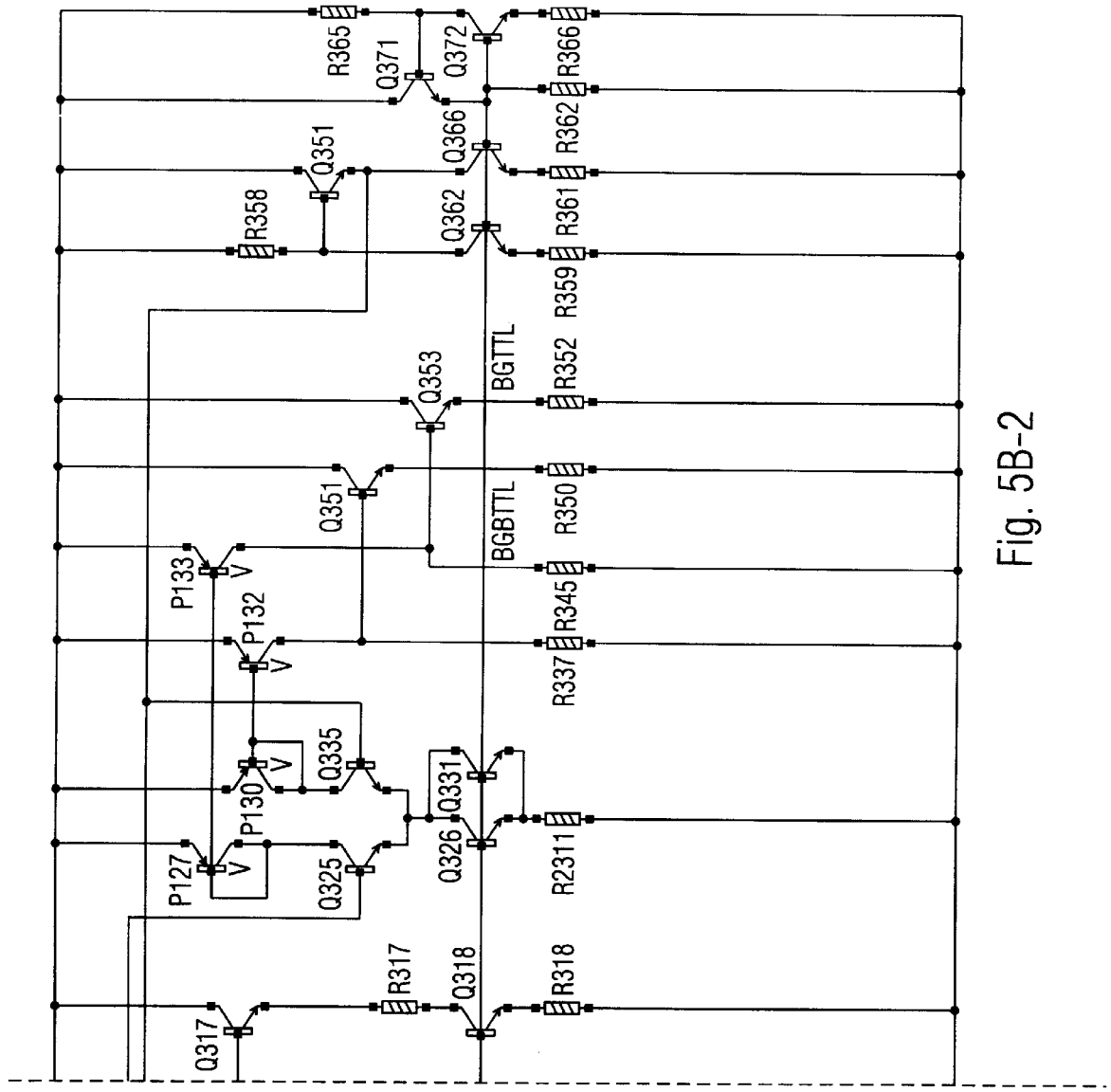

A detailed circuit schematic of the preferred embodiment of the burst gate pulse generator is illustrated in FIGS. 5a and 5b. Together the FIGS. 5a and 5b form a single circuit schematic, with the right edge of the FIG. 5a corresponding to left edge of the FIG. 5b. The preferred embodiment of the present invention is implemented within a video/graphics overlay integrated circuit, Part No. CXA2015Q, which will be available from Sony Corporation of America, 3300 Zanker Road, San Jose, Calif. 95134. Within this integrated circuit, a mixer circuit is used to mix an analog input composite video signal and a digital input composite video signal into a combined output composite video signal.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that the duration of the burst gate pulse may be adjusted, as appropriate for the video system, by changing the values of the current source IO and the capacitor CO of the timing circuit.

We claim:

1. A burst gate signal generation circuit for generating a burst gate signal representing a time period during which a burst signal is present within an input composite video signal comprising:
   a. a receiving circuit configured for receiving the input composite video signal, wherein each period of the input composite video signal includes a horizontal sync pulse, a burst signal and a video information signal;
   b. a clamping circuit coupled to the receiving circuit for clamping a minimum level of the horizontal sync pulse to a predetermined level;
   c. a detecting circuit coupled to the receiving and clamping circuits for detecting a trailing edge of the horizontal sync signal;
   d. a signal generation circuit coupled to the detecting circuit for activating the burst gate signal when the trailing edge of the horizontal sync signal is detected; and
   e. a timing circuit coupled to the signal generation circuit for deactivating the burst gate signal a predetermined time period after it has been activated by the signal generation circuit.

2. The burst gate signal generation circuit as claimed in claim 1 wherein the timing circuit comprises:
   a. a charge storage device for storing an amount of charge; and
   b. a charge delivery device coupled to the charge storage device for delivering a precise amount of charge per time period to the charge storage device, wherein the charge delivery device builds up a charge across the charge storage device when the burst gate signal is active and further wherein the burst gate signal is deactivated when the charge stored by the charge storage device reaches a predetermined threshold level.

3. The burst gate signal generation circuit as claimed in claim 2 wherein the charge storage device is a capacitor and the charge delivery device is a current source.

4. The burst gate signal generation circuit as claimed in claim 3 wherein the burst gate signal is a pulse signal of a duration equal to the predetermined time period.

5. The burst gate signal generation circuit as claimed in claim 4 wherein the predetermined time period is equal to 3.5 nanoseconds.

6. A burst gate signal generation circuit for generating a burst gate signal representing a time period during which a burst signal is present within an input composite video signal comprising:
   a. a receiving circuit configured for receiving the input composite video signal, wherein each period of the input composite video signal includes a horizontal sync pulse, a burst signal and a video information signal;
   b. a clamping circuit coupled to the receiving circuit for clamping a minimum level of the horizontal sync pulse to a first level;
   c. a detecting circuit coupled to the receiving and clamping circuits for detecting a trailing edge of the horizontal sync signal;
   d. a signal generation circuit coupled to the detecting circuit for activating the burst gate signal, wherein the signal generation circuit activates the burst gate signal beginning at the trailing edge of the horizontal sync signal; and
   e. a timing circuit coupled to the signal generation circuit for deactivating the burst gate signal a time period after it has been activated by the signal generation circuit.

7. The burst gate signal generation circuit as claimed in claim 6 wherein the timing circuit comprises:
   a. a charge storage device for storing an amount of charge; and
   b. a charge delivery device coupled to the charge storage device for delivering a precise amount of charge per time period to the charge storage device, wherein the charge delivery device builds up a charge across the charge storage device when the burst gate signal is active and further wherein the burst gate signal is deactivated when the charge stored by the charge storage device reaches a predetermined threshold level.

8. The burst gate signal generation circuit as claimed in claim 7 wherein the timing circuit further comprises a prevention circuit coupled to the charge storage device for preventing the charge stored across the charge storage device from rising above a maximum level.

9. The burst gate signal generation circuit as claimed in claim 8 wherein the charge storage device is a capacitor and the charge delivery device is a current source.

10. The burst gate signal generation circuit as claimed in claim 9 wherein the burst gate signal is a pulse signal of a duration equal to the time period.

11. The burst gate signal generation circuit as claimed in claim 10 wherein the time period is equal to 3.5 nanoseconds.

12. A burst gate signal generation circuit for generating a burst gate signal representing a time period during which a burst signal is present within an input composite video signal comprising:
   a. a receiving circuit configured for receiving the input composite video signal, wherein each period of the input composite video signal includes a horizontal sync pulse, a burst signal and a video information signal;
   b. a clamping circuit coupled to the receiving circuit for clamping a minimum level of the horizontal sync pulse to a first level;
   c. a detecting circuit coupled to the receiving and clamping circuits for detecting a trailing edge of the horizontal sync signal;
   d. a signal generation circuit coupled to the detecting circuit for activating the burst gate signal without delay when the trailing edge of the horizontal sync signal is detected; and
   e. a timing circuit coupled to the signal generation circuit for deactivating the burst gate signal a time period after it has been activated by the signal generation circuit.

13. The burst gate signal generation circuit as claimed in claim 12 wherein the timing circuit comprises:
   a. a charge storage device for storing an amount of charge; and
   b. a charge delivery device coupled to the charge storage device for delivering a precise amount of charge per time period to the charge storage device, wherein the charge delivery device builds up a charge across the charge storage device when the burst gate signal is active and further wherein the burst gate signal is deactivated when the charge stored by the charge storage device reaches a predetermined threshold level.

14. The burst gate signal generation circuit as claimed in claim 13 wherein the timing circuit further comprises a prevention circuit coupled to the charge storage device for preventing the charge stored across the charge storage device from rising above a maximum level.

15. The burst gate signal generation circuit as claimed in claim 14 wherein the charge storage device is a capacitor and the charge delivery device is a current source.

16. The burst gate signal generation circuit as claimed in claim 12 wherein the burst gate signal is a pulse signal of a duration equal to the time period.

17. The burst gate signal generation circuit as claimed in claim 12 wherein the time period is equal to 3.5 nanoseconds.

18. A method of generating a burst gate signal representing a time period during which a burst signal is present within an input composite video signal, wherein each period of the input composite video signal includes a horizontal sync pulse, a burst signal and a video information signal, the method comprising the steps of:

a. clamping a minimum level of a horizontal sync signal to a first level;

b. detecting a trailing edge of a horizontal sync signal within the input composite video signal;

c. activating a burst gate signal beginning at the trailing edge of the horizontal sync signal; and d. deactivating a burst gate signal a period of time after the trailing edge of the horizontal sync signal is detected.

19. The method as claimed in claim 18 wherein the burst gate signal is a pulse signal of a duration equal to the period of time.

20. The method as claimed in claim 19 wherein the period of time is equal to 3.5 nanoseconds.

21. The method as claimed in claim 18 wherein the first level is equal to 2.5 volts.

* * * * *

UNITED STATES PATENT AND TRADEMARK OFFICE
CERTIFICATE OF CORRECTION

PATENT NO.   :   6,046,776

DATED        :   April 4, 2000

INVENTOR(S)  :   Ngo et al.

It is certified that error appears in the above-identified patent and that said Letters Patent is hereby correct as shown below:

On the title page.

IN THE REFERENCES CITED [56]

The following U.S. Patent Documents need to be added:

| | | | |
|---|---|---|---|
| --3,730,982 | 5/1973 | Niimi et al. | 178/5.4CK |
| 4,054,903 | 10/1977 | Ninomiya | 358/8 |
| 4,120,000 | 10/1978 | Ninomiya | 358/8 |
| 4,165,524 | 8/1979 | Ninomiya | 360/36 |
| 4,173,023 | 10/1979 | Lagoni et al. | 358/20 |
| 4,228,456 | 10/1980 | Lovely | 358/20 |
| 4,404,583 | 9/1983 | Tatami | 358/13 |
| 4,714,954 | 12/1987 | Yoshinaka et al. | 358/19 |
| 4,733,311 | 3/1988 | Yoshinaka | 358/320 |
| 5,130,785 | 7/1992 | Jang et al. | 358/20 |
| 5,386,296 | 1/1995 | Craft | 358/316-- |

Signed and Sealed this

Twenty-seventh Day of March, 2001

Attest:

NICHOLAS P. GODICI

Attesting Officer

Acting Director of the United States Patent and Trademark Office